Dec. 3, 1963 J. L. BONANNO 3,113,186

TELEPHONE DEVICE

Filed Feb. 6, 1962 2 Sheets-Sheet 1

INVENTOR
JOSEPH L. BONANNO
BY
Nolte & Nolte
ATTORNEYS

INVENTOR
JOSEPH L. BONANNO
BY
Nolte, & Nolte
ATTORNEYS

United States Patent Office 3,113,186

Patented Dec. 3, 1963

3,113,186

TELEPHONE DEVICE

Joseph L. Bonanno, South Orange, N.J., assignor, by mesne assignments, to Walter E. Heller & Company, (Inc.), New York, N.Y., a corporation of Delaware Filed Feb. 6, 1962, Ser. No. 171,450
4 Claims. (Cl. 179—101)

This invention relates to educational toys. More particularly, the invention relates to voice-powered telephone apparatus for use as a child's educational plaything.

According to the invention, a voice-powered telephone is provided, either in a knocked-down or in an assembled form, so that persons, particularly persons belonging to a young age group, may learn and comprehend certain principles of nature by engaging in activities relating to the principles of the invention.

Another object is to teach these laws of physics in a pleasant and easily comprehensible manner.

Still another object of the invention is to provide a voice-powered telephone of simple construction.

Another object of the invention is to provide means for introducing students to the history of scientific development.

According to the invention, a telephone is provided, either assembled or in a knocked-down kit form, for the reception of sound waves. The sound waves cause a diaphragm to vibrate, which, in turn, varies the magnetic lines of force of an adjacent magnet to induce a varying current flow in a coil proportional to the vibrations of the diaphragm. The varying current, which flows through the coil, may be connected to another similarly constructed telephone set, where the current in the coil will cause changes in the magnetic forces in the second telephone to vibrate the diaphragm in the second set, thus emitting sound waves for reception. The above-mentioned process can be reversed so that the second set which has been the receiver, will become the transmitter, and the first set which has formerly been a transmitter, will become a receiver.

Further objects and advantages of the present invention will become apparent from the following detailed description and the appended drawings, wherein.

Figure 1:
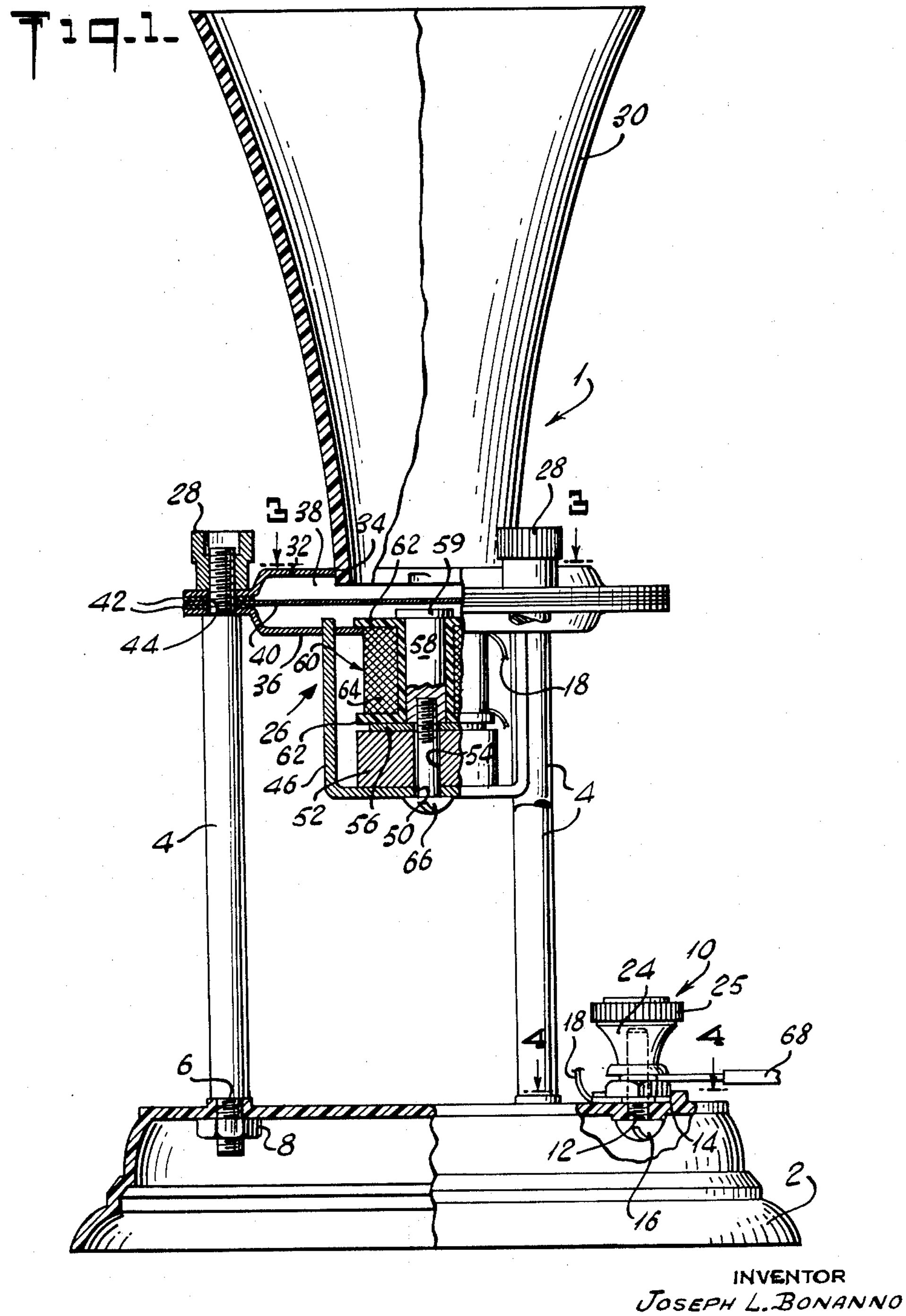
FIG. 1 is a sectional-elevational view of a telephone set according to the invention.
Figure 2:
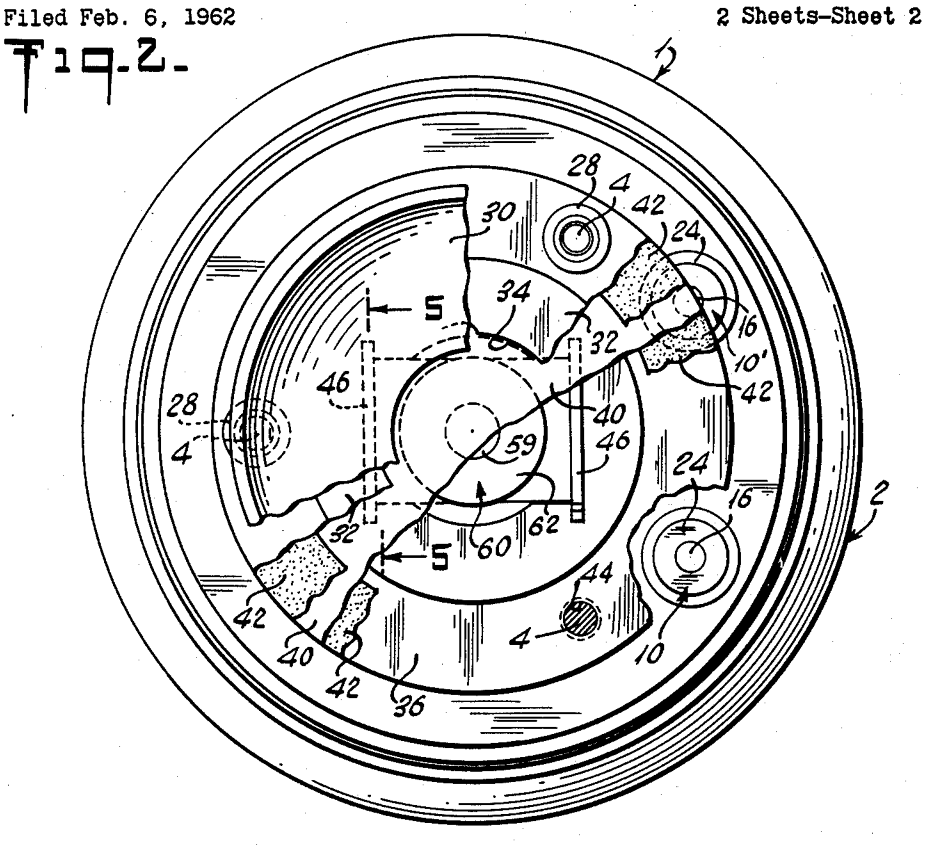
FIG. 2 is a partially broken away plan view of the invention.

In FIGS. 1 and 2, the telephone set 1 is shown resting on a base 2. In the preferred embodiment, the base 2 is made of plastic, although it can be made of wood or any other insulating material. If it is made of metal, electrical insulation has to be provided for electrical connections made from the base. Upstanding posts 4 threaded and shouldered at their lower ends are secured through bores 6 in the base 2, by means of securing nuts 8. A terminal assembly 10 consisting of terminals 10′ and 10″ is also secured to the base 2. Bores 12 and recesses 14 are adapted to secure the terminals 10′ and 10″ to the base 2. In each terminal, a terminal bolt 16, with its threaded portion protruding upwardly, projects through the bore 12. A lead 18 projects through a break 20 in each recess 14 and is wound around the upstanding shank of the terminal bolt 16 for electrical connection thereto. The recesses 14 are formed to define upstanding hexagonal sidewalls so that a nut 22, when threaded over the bolt 16, is prevented from rotation and loosening when once tightened over the lead 18. Terminal nuts 24 are formed with a knurled upper rim 25 to facilitate their attachment by hand onto the free ends of terminal bolts 16.

Figure 3:
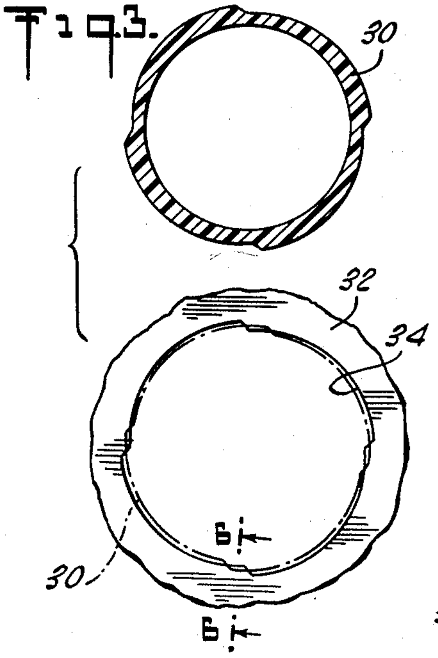
FIG. 3 is an exploded sectional view taken along line 3—3 of FIG. 1, and showing the mode of attachment of the sound cone to the set.
Figure 4:
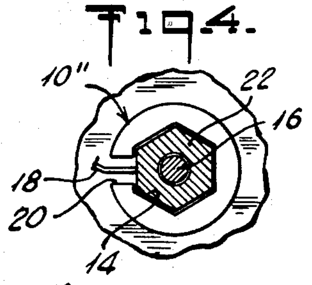
FIG. 4 is a sectional view taken along line 4—4 of FIG. 1, and showing the terminal structure.
Figure 6:
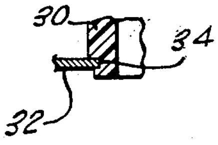
FIG. 6 is a sectional view taken along line 6—6 of FIG. 3.

The posts 4 are also shouldered and threaded on their upper ends and are adapted to carry the voice conversion assembly 26, fastened thereto, by means of knurled thumb nuts 28. The voice conversion assembly 26 includes a sound cone 30, in the preferred embodiment made of plastic. The bottom of the cone 30 is made in the form of a bayonet attachment, as best shown in the upper part of FIG. 3. A top cover 32 has an opening 34 having a complementary bayonet socket, so that the sound cone 30, when first inserted into the top cover 32, can be locked therein by twisting the bayonet locking elements into engagement; resulting in the locking elements of the top cover 32 biting into the material of the sound cone 30. This locking engagement is best shown in the bottom part of FIG. 3 by broken lines and also in FIG. 6.

Figure 5:
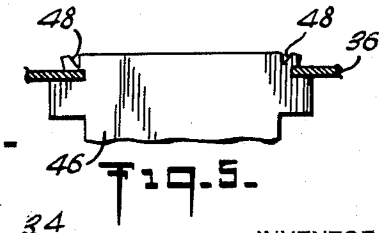
FIG. 5 is a sectional view taken along line 5—5 of FIG. 2 and showing the bracket attachment.

The top cover 32 and a bottom cover 36 are formed with recessed center portions, so that when their peripheral flanges are placed face to face, as shown in FIG. 1, a space 38 is defined between them. A diaphragm 40 formed from a relatively thin, magnetic metal sheet is placed between the flanges of the top cover 32 and the bottom cover 36, so that the central portion of the diaphragm divides the space 38 into two separate chambers. Gaskets 42 are disposed on each side of the diaphragm 40, the width of the ring-formed gaskets being approximately the same as the width of the flange portion of the top cover 32 and of the bottom cover 36. Bores 44 are formed by the aligned bores in the flange portions of the top cover 32, bottom cover 36, the diaphragm 40 and the gaskets 42. The upper threaded portion of the posts 4 projects through the bores 44 and the knurled thumb nuts 28, when tightened, serve to fasten the voice conversion assembly 26 to the posts 4. The bottom cover 36 is formed with a central opening, having a bracket 46 staked at 48 to the bottom cover 36 (FIG. 5). The bracket 46 is U-shaped, made of a magnetic material and it is provided with a hole 50 in the center of its bottom.

A disc magnet 52 is disposed within the U-shaped bracket 46, the center hole 54 of the magnet 52 being in alignment with the hole 50. A washer 56 is disposed above and in alignment with magnet 52. A vertical core 58, having a threaded recess at its lower extremity, is surrounded by a core assembly 60. The core assembly 60 consists of a spool-like coil form 62 and a winding 64, and is supported together with the washer 56 and the magnet 52 inside the bracket 46, by means of a screw 66. The core 58 is formed at the end opposite its threaded end with a rim 59 for holding down the spool 62 when the screw 66 is tightened.

The leads 18 comprise the ends of the winding 64. The desired distance between the diaphragm 40 and the top of the core 58 can be adjusted by proper selection of the thickness of the washer 56 or by the provisions of additional washers. In the preferred embodiment, the spool 62 of the coil assembly 60 is made of a plastic material.

In operation, two telephone sets 1 are connected by means of leads 68 attached to the terminal assemblies of each set. When sound is directed into the sound cone 30 of the first set 1, the diaphragm 40 begins to vibrate accordingly. As the vibrating diaphragm 40 moves relative to the core 58, the varying magnetic lines of force induce a varying current flow within the coil winding 64, causing a varying current to flow through the leads 18 and 68 to the second set.

The bracket 46, being made of a magnetic material, makes the operation of the device more efficient, since it receives the magnetic lines of force and provides a less impeded path for them than if they would pass all the way back to the other pole through air.

At the second set, corresponding vibrations are created in the diaphragm 40 of the second set, converting the varying current back into sound waves. Similarly, the second set can also act as a transmitter, in which case the first set will be the receiver.

It is to be understood that the embodiment described in the preceding was shown for purposes of illustration only and the scope of the invention is to be interpreted from the appended claim .

I claim:

1. A telephone, comprising a supporting base, a plurality of rods each inserted at one end into said base and affixed thereto, a first plate supported on the other ends of said rods, said plate having a depressed area and an opening in said area, a magnetic diaphragm supported on top of said plate at a distance from said depressed area, a U-shaped bracket made of magnetic material suspended from said opening, a permanent magnet and a coil supported by said bracket beneath said opening, one end of said magnet being in magnetic contact with said bracket, said coil being arranged in proximity to said diaphragm on top of said permanent magnet, a spool-like non-magnetic coil form for supporting said coil, a core in magnetic contact with the other end of said magnet and having a threaded opening at its bottom and a flange at its top, said core extending through said coil and the center of said coil form with said flange extending over said coil form, a screw extending through said bracket and permanent magnet into engagement with said core for securing said core, coil form and permanent magnet to said bracket, and a second plate having a raised area and an opening therein supported on top of said diaphragm, the diaphragm coupling the magnetic flux from said core to said bracket to complete a magnetic circuit, whereby vibration of said diaphragm produces a varying magnetic field to generate a current flow in said coil, and whereby varying current flow in said coil produces a varying magnetic field causing vibration of said diaphragm.

2. A telephone according to claim 1, further including a horn having its small diameter opening attached to the opening of said second plate.

3. A telephone according to claim 2, including terminal means fixed to said base and electrically connected to said coil.

4. A toy telephone, comprising a first plate having a depressed area and an opening in said area, a magnetic diaphragm supported on top of said plate at a distance from said depressed area, a bracket made of a magnetic material suspended downwardly from said opening, a permanent magnet and a coil supported on said bracket beneath said opening, one end of said magnet being in magnetic contact with said bracket, a spool-like non-magnetic coil form for supporting said coil, a core in magnetic contact with the other end of said magnet and having a threaded opening at its bottom end and a flange at its top end, said core extending through the center of said coil form and said flange extending over said coil form, a screw extending through said bracket and permanent magnet into engagement with said threaded opening for securing said core, coil form and permanent magnet to said bracket, and a second plate having a raised area and an opening therein supported on top of said diaphragm, the diaphragm coupling the magnetic flux from said core to said bracket to complete the magnetic circuit, whereby when said diaphragm is caused to vibrate a current is induced in said coil in proportion to the vibration of said diaphragm.

References Cited in the file of this patent

UNITED STATES PATENTS

| | | |
|---|---|---|
| 326,675 | Rogers | Sept. 22, 1885 |
| 390,428 | Wright | Oct. 2, 1888 |
| 861,459 | Gross | July 30, 1907 |
| 1,565,974 | Whitson | Dec. 15, 1925 |
| 1,616,620 | Herdman | Feb. 8, 1927 |
| 2,298,764 | Horlacher | Oct. 13, 1942 |
| 2,794,862 | Topholm | June 4, 1957 |

FOREIGN PATENTS

| | | |
|---|---|---|
| 289,293 | Italy | Oct. 12, 1931 |
| 329,939 | Switzerland | May 15, 1958 |